3,086,860
POROUS METALLIC MEMBRANES AND METHODS OF MANUFACTURING THEM
Gilberte Moutaud, nee Renault, Neuilly-sur-Seine, France, assignor to Commissariat a l'Energie Atomique, Paris, France, a French state administration
No Drawing. Filed July 22, 1957, Ser. No. 673,543
Claims priority, application France July 25, 1956
5 Claims. (Cl. 75—222)

The present invention relates to porous metallic membranes, and its chief object is to provide a method of making such membranes for obtaining diffusion barriers.

Such a method is essentially characterized, according to my invention, in that a very fine powder of a metal or a metal compound is mixed with a suspension of a plastifying material capable of permitting agglomeration of the finely divided metal or metal compound, this mixture being subsequently flocculated, then laminated, and sintered at high temperature, in such manner as to eliminate the whole of the plastifying material therefrom.

The starting material may consist, for instance, of a very fine powder of a metal, such as nickel, or a metal oxide (for instance nickel oxide), which may be placed in suspension or not. The result will be the better as the metal compound is more homogeneous and more finely dispersed. The preferred dimensions of the grain size range from 10 to 25 microns. This compound may be in the form of a colloidal suspension of a metal hydroxide.

When the starting material is in the form of a suspension, it is mixed with the suspension of plastifying material. The mixture is homogenized by a constant stirring and is flocculated with alcohol according to a known process. The coagulate thus obtained contains a very homogeneous dispersion of the particles in the binder.

The plastifying material with which the metal compound is mixed may preferably be a substance which permits agglomeration of this finely divided compound, which does not stick during the laminating or rolling operation and which is wholly eliminated (i.e. without leaving any residue) during sintering or by mere heating.

All these conditions are complied with when the plastifying material consists of fluorohydrocarbon or chlorofluorohydrocarbon polymers used in the suspension form, such as polytetrafluoroethylene or polytrifluoromonochloroethylene, or greases or waxes of halogenated hydrocarbons, or again mixtures of these substances.

It seems particularly interesting to use a suspension of polytetrafluoroethylene as plastifying material, because this body not only has higher plastic characteristics than camphor, naphthalene and other plastifying resins, but also does not stick during the laminating or rolling operations. Furthermore, when heated, it decomposes only at temperatures ranging from 360 to 400° C. and is then wholly eliminated without leaving any residue and without altering the metal compound.

When the plastifying substance has the consistency of a grease, a wax or an oil, it is mixed with the metal compound powder in proportions such that the resulting paste can be laminated or rolled.

The laminated products are then subjected to a sintering treatment at high temperature, preferably in a reducing atmosphere which has, in particular, the purpose of reducing the metal compound when said compound is for instance an oxide.

However it is advisable, in order further to improve the mechanical properties of the membranes and to avoid a growth of the elementary grains of metal, to proceed in two steps. For instance, when the metal compound is an oxide, the product may be sintered, while the plastifying substance is being driven off, in an oxidizing or neutral atmosphere above 1000° C., after which the metal oxide is reduced in a hydrogen atmosphere at a temperature ranging from 450 to 800° C.

It is also possible simultaneously to reduce the oxide and to drive off the plastifying material by heating in a reducing atmosphere ranging from 450 to 800° C. until complete reduction and sintering of the metal are achieved.

In some cases, a heating may be performed between two laminating or rolling operations, so as to eliminate the effects of the mechanical treatment on the metal.

The porous membranes according to the present invention are particularly well adapted to the separation of uranium isotopes by gaseous diffusion of uranium hexafluoride, but their field of application also covers osmometric and catalytic phenomenons, fractionating treatments of high polymers of different respective molecular weights, accumulators and, in a general manner, all methods of ultrafiltering in all gaseous or liquid mediums, even corrosive ones.

I will now describe an example, having no limitative character, of the method of manufacturing porous membranes according to the present invention.

In this example, a nickel powder is placed in suspension in water and a 60% emulsion of polytetrafluoroethylene in water is added thereto so as to obtain a mixture containing from 70 to 90% of nickel powder and from 30 to 10% of polytetrafluoroethylene.

This mixture is coagulated by means of a solvent, for instance alcohol, then the excess of water is removed.

The resulting product is laminated so as to form strips or sheets of a thickness ranging from 0.5 to 1.5 millimeters, which are dried in the atmosphere in order to eliminate any traces of solvent and of water. These strips or sheets are laminated again several times in order to reduce porosity and obtain a smooth and bright surface.

The resulting strips or sheets are heated in hydrogen at a temperature ranging from 600 to 800° C. so as to eliminate the polytetrafluoroethylene and to sinter the nickel. The sintered product is laminated or rolled once or several times in order to obtain a porosity averaging one hundredth of a micron. The thickness of the membranes then averages 25 hundreds of a millimeter.

Measurements of the permeability of these membranes is performed with dry air at ordinary temperature so that the mean radius of the pores that are obtained ranges from 0.06 to 0.20 micron and that the corresponding flow rates range from 30 to $300 \cdot 10^{-7}$ molecules-grams of air, per cm. of mercury of pressure difference, per sq. cm. of membrane and per minute.

What I claim is:
1. A method of making porous nickel membranes comprising mixing a finely divided nickel suspension with an aqueous polytetrafluoroethylene suspension, adding a solvent, thereby obtaining a coagulate containing the nickel in homogeneous dispersion in the polytetrafluoroethylene, forming the coagulate to a sheet and heating said sheet at a temperature of about 450 to 800° C., thereby simultaneously evaporating the polytetrafluoroethylene and sintering the nickel powder to a porous membrane.

2. The method claimed in claim 1 wherein said solvent is alcohol.

3. A method of making porous nickel membranes comprising mixing a finely divided aqueous suspension of nickel oxide with an aqueous polytetrafluoroethylene suspension, adding a solvent, thereby obtaining a coagulate containing the nickel oxide in homogeneous dispersion in the polytetrafluoroethylene, forming the coagulate to a sheet, and heating said sheet at a temperature of about 450 to 800° C., thereby simultaneously evaporating the polytetrafluoroethylene, reducing the nickel oxide to nickel powder, and sintering the nickel powder to a porous membrane.

4. A method of making porous nickel membranes comprising mixing a finely divided aqueous suspension of a member of the group consisting of nickel and nickel oxide with an aqueous polytetrafluoroethylene suspension, adding a solvent, thereby obtaining a coagulate containing said member in homogeneous dispersions in the polytetrafluoroethylene, forming the coagulate to a sheet, heating the sheet to remove the water and solvent, and finally heating the sheet in hydrogen at a temperature of about 450 to 800° C., thereby evaporating the polytetrafluoroethylene and producing a porous nickel membrane.

5. The method as claimed in claim 4 wherein said solvent is alcohol.

References Cited in the file of this patent
UNITED STATES PATENTS

| | | |
|---|---|---|
| 2,456,262 | Fields | Dec. 4, 1948 |
| 2,593,943 | Wainer | Apr. 22, 1952 |
| 2,622,024 | Gurnick | Dec. 16, 1952 |
| 2,661,387 | Ackermann | Dec. 1, 1953 |
| 2,689,178 | Hignett | Sept. 14, 1954 |